(12) United States Patent
Matsumoto

(10) Patent No.: US 7,257,573 B2
(45) Date of Patent: Aug. 14, 2007

(54) INFORMATION DISPLAY APPARATUS

(75) Inventor: Tomoko Matsumoto, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 457 days.

(21) Appl. No.: 10/900,572

(22) Filed: Jul. 28, 2004

(65) Prior Publication Data
US 2005/0050031 A1 Mar. 3, 2005

(30) Foreign Application Priority Data
Jul. 29, 2003 (JP) .............................. 2003-281621

(51) Int. Cl.
G06F 7/00 (2006.01)
(52) U.S. Cl. .............................. 707/3; 707/102; 707/4; 707/5; 707/6; 707/201
(58) Field of Classification Search ..................... 707/3
See application file for complete search history.

(56) References Cited

U.S. PATENT DOCUMENTS

| 6,029,141 | A * | 2/2000 | Bezos et al. ................. 705/27 |
| 6,266,649 | B1 * | 7/2001 | Linden et al. ............... 705/26 |
| 6,401,077 | B1 * | 6/2002 | Godden et al. .............. 705/26 |
| 6,763,496 | B1 * | 7/2004 | Hennings et al. ......... 715/501.1 |
| 6,882,981 | B2 * | 4/2005 | Philippe et al. ............. 705/26 |
| 6,917,922 | B1 * | 7/2005 | Bezos et al. ................. 705/27 |
| 2001/0032146 | A1 * | 10/2001 | Kutaragi et al. ............ 705/26 |
| 2001/0056460 | A1 | 12/2001 | Sahota et al. |
| 2002/0156812 | A1 | 10/2002 | Krasnoiarov et al. |
| 2003/0055812 | A1 * | 3/2003 | Williams et al. ............. 707/1 |
| 2003/0065562 | A1 * | 4/2003 | Matsui et al. ............... 705/14 |
| 2003/0070143 | A1 | 4/2003 | Maslov |
| 2003/0110156 | A1 | 6/2003 | Iwamoto et al. |
| 2003/0120599 | A1 * | 6/2003 | Agboatwalla et al. ...... 705/50 |

FOREIGN PATENT DOCUMENTS

| EP | 1 176 521 | 1/2002 |
| WO | WO 01/27712 | 4/2001 |
| WO | WO 02/084532 | 10/2002 |

* cited by examiner

Primary Examiner—Don Wong
Assistant Examiner—Binh V Ho

(57) ABSTRACT

An information display apparatus obtains a plurality of pieces of web data from one or more web servers connected to a network, each piece of web data composing either a portion of or a whole web page. The information display apparatus then receives an instruction from a user for specifying information to be extracted from each of the obtained pieces of web data, extracts the specified information from each of the obtained pieces of web data, constructs one screen using the extracted information, and displays the constructed screen.

13 Claims, 13 Drawing Sheets

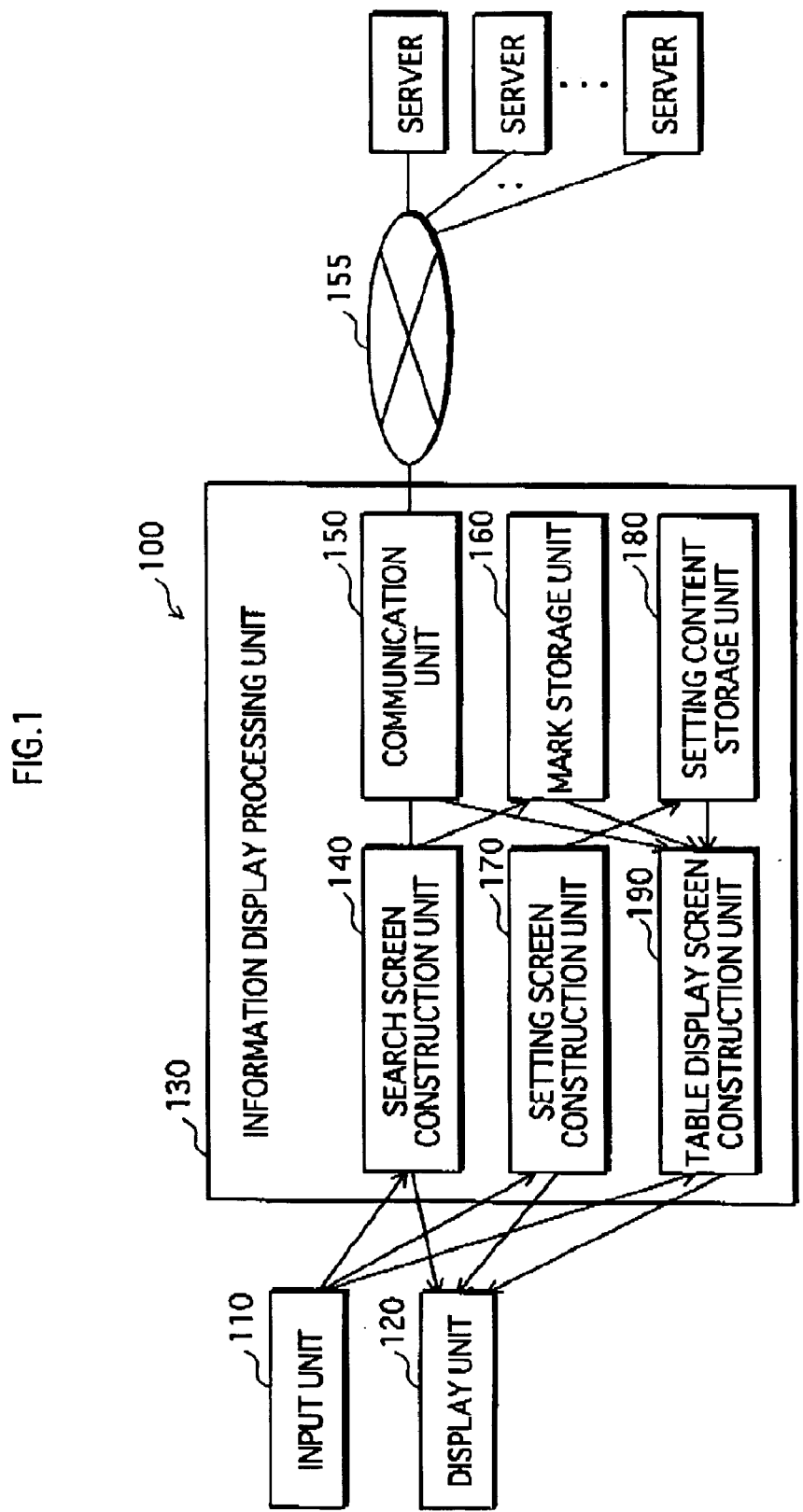

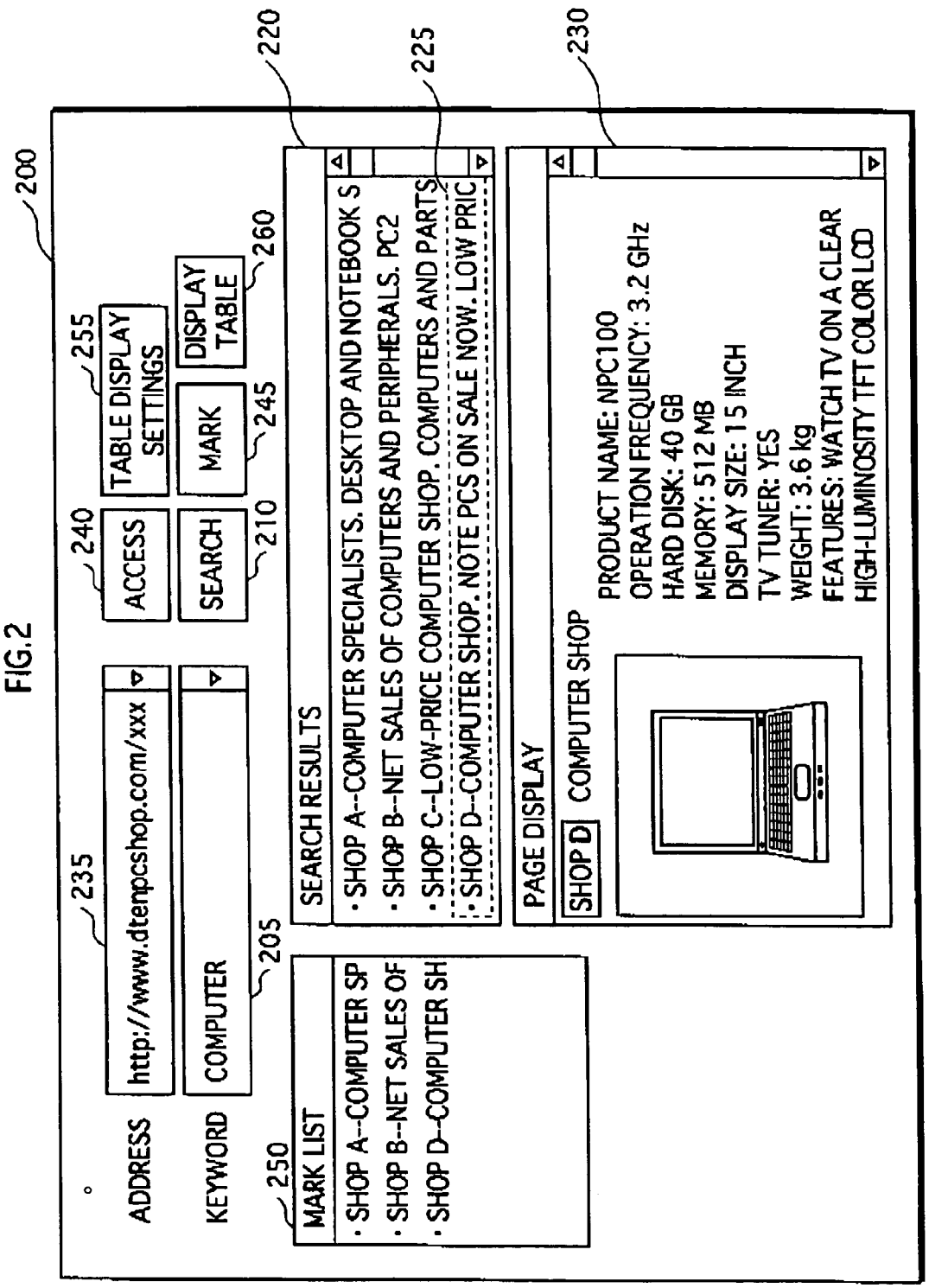

FIG.3

| PRODUCT NAME | TVPC70 | DPC17 | NPC100 | X300 |
|---|---|---|---|---|
| IMAGE | | | | |
| OPERATION FREQUENCY | 2.5GHz | 2.3GHz | 3.2GHz | 1.1GHz |
| HARD DISK CAPACITY | 160GB | 200GB | 40GB | 80GB |
| DISPLAY SIZE | 15 INCH | 17 INCH | 15 INCH | 16 INCH |
| FEATURES | [N/A] | 17 INCH WIDE LCD, SMART DESIGN | WATCH TV ON A CLEAR HIGH-LUMINOSITY TFT COLOR LCD | WIRELESS KEYBOARD AND FLAT PANEL LCD SAVE SPACE |
| TV TUNER | YES | NO | YES | NO |
| ADDRESS | SHOP A http://www.ashop..... | SHOP B http://www.btenop..... | SHOP D http://www.dten..... | SHOP F http://www.fshop..... |

TABLE DISPLAY SETTINGS

DISPLAY SEARCH SCREEN

```
<HTML>
<HEAD>
<TITLE> SHOP D COMPUTER SHOP. NOTE PCS ON SALE NOW. </TITLE>   ~510
5% OFF NOTE PCS. </TITLE>
<H1> SHOP D COMPUTER SHOP </H1>
<H1><IMG SRC="NPC100IMAGE.GIF>   ~520
..
PRODUCT NAME: NPC100
OPERATION FREQUENCY: 3.2 GHz
HARD DISK: 40 GB
MEMORY: 512 MB
DISPLAY SIZE: 15 INCH
TV TUNER: YES
WEIGHT: 3.6 kg
FEATURES: WATCH TV ON A CLEAR HIGH-LUMINOSITY TFT COLOR LCD
..
</H1>
</BODY>
</HTML>
```

530

NPC100IMAGE.GIF

FIG.7

| ADDRESS | MARK CONTENT | MARK POSITION |
|---|---|---|
| http://www........ | STORE HTML DOCUMENT AND IMAGE FILE INDICATING FIG. 5A AND 5B | — |
| http://www........ | STORE DATA CORRESPONDING TO PORTION OF FIG. 6 INDICATED BY 610 | STARTING POINT(x1,y1) ENDING POINT(x2,y2) |

FIG. 8

| KEYWORD | TABLE DISPLAY ITEMS |
|---|---|
| PERSONAL COMPUTER/COMPUTER/PC/NOTEBOOK COMPUTER/NOTEBOOK PC/DESKTOP/.../... | OPERATION FREQUENCY/HARD DISK CAPACITY/ MEMORY CAPACITY/DISPLAY SIZE/ SCREEN RESOLUTION/ WEIGHT/PRICE/MANUFACTURER |
| DIGITAL CAMERA/DIGICAM/CAMERA/.../... | LENS/OPTICAL ZOOM/EFFECTIVE PIXEL COUNT/ LCD MONITOR/RECORDING MEDIUM/ VIDEO RECORDING/AUDIO RECORDING/ BATTERY RECHARGE/SIZE/WEIGHT/PRICE/MANUFACTURER |
| CD PLAYER/MD PLAYER/MP3 PLAYER | SOUND FUNCTION/RECHARGE TIME/BATTERY LIFE/ WEIGHT/PRICE/MANUFACTURER |

FIG.9

| EXTRACTED ITEM | EXTRACTION PROGRAM CONTENT |
|---|---|
| OPERATION FREQUENCY | • EXTRACT NUMBER STRING AFTER "FREQUENCY" OR "OPERATION FREQUENCY"<br>• EXTRACT NUMBER STRING BEFORE "GHz", "GIGA Hz" OR "GIGAHERTZ" |
| HARD DISK CAPACITY | • EXTRACT NUMBER STRING AFTER "HARD DISK", "HARD DISK CAPACITY", "HD", OR "HDD"<br>• EXTRACT NUMBER STRING BEFORE "GB", "G BYTE", OR "GIGABYTE" |
| MEMORY CAPACITY | • EXTRACT NUMBER STRING AFTER "MEMORY" OR "MEMORY CAPACITY"<br>• EXTRACT NUMBER STRING BEFORE "MB", "M BYTE", OR "MEGABYTE" |
| DISPLAY SIZE | • EXTRACT NUMBER STRING BEFORE "INCH"<br>• EXTRACT NUMBER STRING AFTER "DISPLAY SIZE" |
| SCREEN RESOLUTION | • EXTRACT NUMBER STRING AFTER "RESOLUTION", "X", NUMBER STRING |
| WEIGHT | • EXTRACT NUMBER STRING BEFORE "Kg", "g", "KILOGRAM", "GRAM"<br>• EXTRACT NUMBER STRING AFTER "WEIGHT" |
| PRICE | • EXTRACT NUMBER STRING AFTER "¥"<br>• EXTRACT NUMBER STRING BEFORE "YEN"<br>• EXTRACT NUMBER STRING AFTER "PRICE" |
| MANUFACTURER | • EXTRACT "XX ELECTRONICS", "XX ELECTRICAL", "XXXX" |

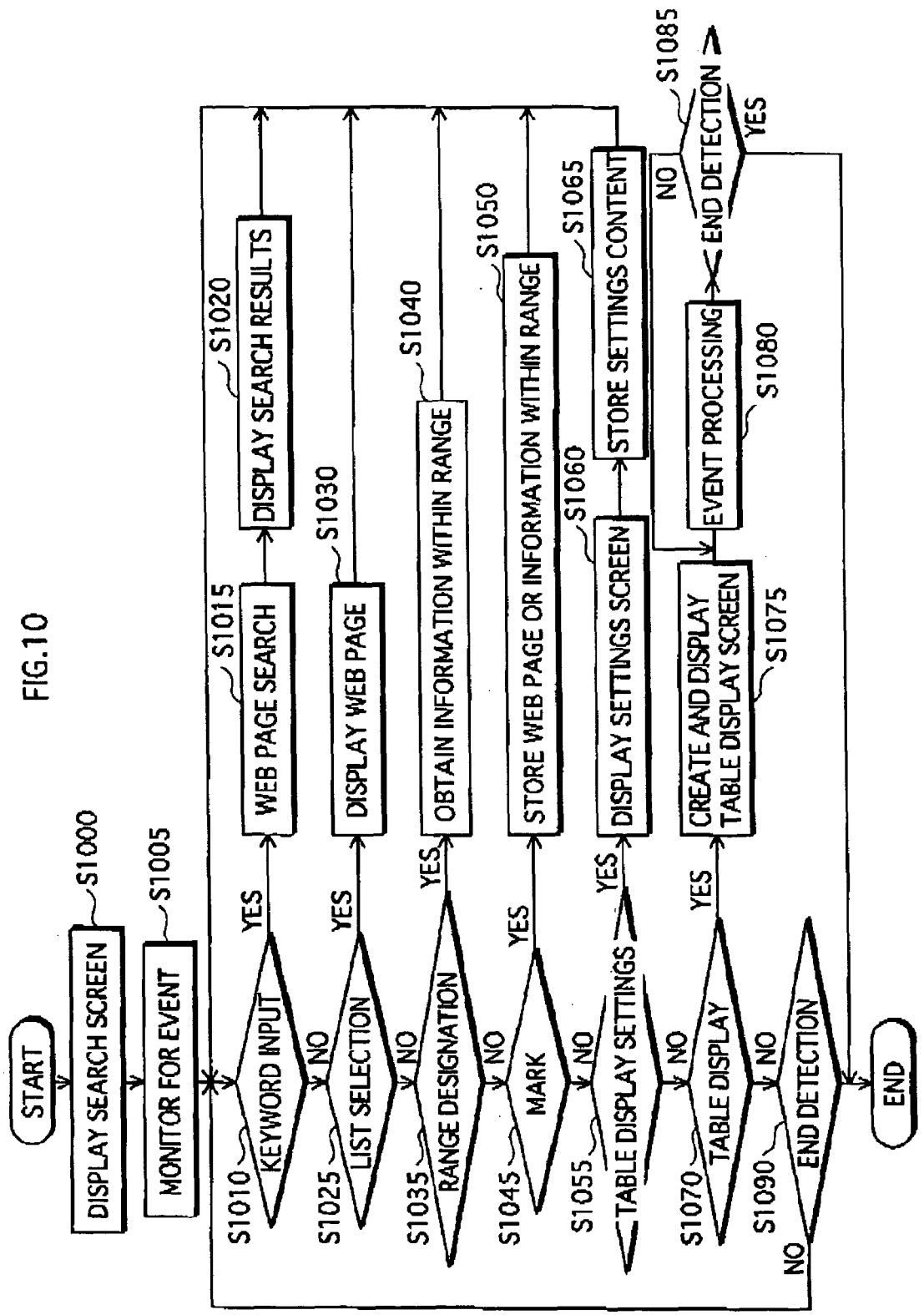

INFORMATION DISPLAY APPARATUS

This application is based on an application No. 2003-281621 filed in Japan, the content of which is hereby incorporated by reference.

BACKGROUND OF THE INVENTION (1) Field of the Invention

The present invention relates to a technique for aspects of display in an information display apparatus that collects and displays a plurality of pieces of information about products or services presented on web pages or the like on a network.

(2) Description of the Related Art

Numerous online sales sites that sell products on the Internet currently exist. A user who accesses such a sales site is able to purchase a product by selecting from among products presented on web pages on the site, and inputting a payment method, an address, and the like. Such sales sites are increasing in number year by year, and the products sold are becoming more diverse. This is convenient for the user because various products can be purchased without visiting shops.

However, although convenient, the enormous number of such sales sites means that the user must spend much time searching sites for products, comparing prices, functions and the like of the products, and finding a product that fits the user's conditions for purchase.

For this reason, in recent years product comparisons sites have come into existence that provide users of the site with functions such as searching for products from the same category provided by a plurality of sales sites, and displaying comparison tables of the price and functions of products found as a result of such a search.

In order to provide functions such as searching and comparison tables, the administrator of a product comparison site receives submissions of product listings from sales sites and creates a database of categories and various types of items such as price and function of the products of the sales sites from which submissions have been received.

However, since a product comparison site lists only products from sales sites that have made submissions, a user is often unable to view products from a sales site whose products he or she wishes to view. Furthermore, since the comparison tables of price and functions that is provided by the product comparison site is based on items in a database created by the administrator, items that the user wishes to view may be lacking. For example, the user may wish to compare computers provided by various sales sites by weight or by the presence/absence of television tuner. However, if the administrator of the product comparison site does not include such items in the database, weight or of presence/absence of television tuner will not be displayed in the comparison table.

SUMMARY OF THE INVENTION

In view of the stated problems, an object of the present invention is to provide an information display apparatus capable of displaying information desired by a user for comparison of products from web sites desired by the user.

In order to solve the stated problems, the information display apparatus of the present invention is an information display apparatus, including: an obtaining unit operable to obtain, from one or more web servers connected to a network, a plurality of pieces of web data, each piece of web data composing either a portion of or a whole web page; a reception unit operable to receive, from a user, an instruction for specifying information to be extracted from each of the obtained pieces of web data; and a display unit operable to extract the specified information from each of the obtained pieces of web data, construct one screen using the extracted information, and display the constructed screen.

According to the stated structure, the user is able to instruct which information is extracted from the web pages and displayed on the screen. Accordingly, if the web sites include various information about products, the user is able to instruct which information is extracted and displayed from among the various information about the product. With a conventional product comparison site, the user is able to view only information from a data base prepared by the administrator of the site, however, with the information display apparatus of the present invention, the user is also able to view information not included in a database.

In addition, according to the stated structure, the information display apparatus extracts and displays the information each time a user instruction is received, and therefore eliminates the need, which exists in a conventional product comparison site, to create and store a database recording items about products. This saves storage capacity that would be required for a database, and eliminates the labor required for creating a database.

Here, the received instruction may indicate (i) a predetermined character string that is in association with the information to be extracted, and (ii) a positional relationship between the information to be extracted and the predetermined character string, and be for specifying the information to be extracted, and the display unit may search each of the obtained pieces of web data for the predetermined character string, specify the information to be extracted based on the positional relationship with the predetermined character string found as a result of the search, extracts the information, construct the screen which lists the information extracted from each of the pieces of web data, and display the constructed screen.

According to the stated structure, the user is able to instruct which information is to be extracted by indicating a predetermined character string stored in association with a positional relationship. For example, if the user, when investigating computers, wishes to have the operation frequency of computers extracted from the web data, the user designates "operation frequency" as the predetermined character string and designates that the information to be extracted is that after the predetermined character string. With such a designation, the display unit searches for the character string "operation frequency", extracts the character string thereafter, in other words a value of an operation frequency such as 3.2 GHz, and displays the extracted character string on the screen.

Here, in addition to indicating the predetermined character string and the positional relationship, the received instruction may indicate an amount of information to be extracted, and is for specifying the information to be extracted, and the display unit may search each of the obtained pieces of web data for the predetermined character string, specify the information to be extracted based on the positional relationship with the predetermined character string found as a result of the search, extract an amount of the information indicated in the instruction, construct the screen which lists the information extracted from each of the pieces of web data, and display the constructed screen.

According to the stated structure, the amount of information to be extracted can be designated. The amount is, for example, a character count, but is not limited to being so, and may be a line count, or may be any other unit by which the amount of information to be extracted can be specified.

Here, the reception unit may include: a candidate storage subunit operable to store in correspondence, for each of a plurality of candidates for the information to be extracted, a name expressing the information to be extracted and the instruction for specifying the information to be extracted; and a candidate selection subunit operable to present the names stored in the candidate storage subunit to the user, and have the user select one or more of the names, and the reception unit, for each of the one or more selected names, may read the instruction corresponding to the name, and receive the read instruction as the instruction from the user.

According to the stated structure, the user is able to select information to be extracted from the candidates presented by the information display apparatus, and have the selected information extracted.

Here, the plurality of candidates for information to be extracted may be sorted into a plurality of categories, the candidate storage subunit may store the name and instruction of each candidate in correspondence with the category of the candidate, and the candidate selection subunit may receive a designation of one of the categories from the user, read the names in the designated category from the candidate storage subunit, present the read names to the user, and have the user select one or more of the names.

According to the stated structure, the user selects information to be displayed from candidates which differ for each category presented by the information display apparatus, and has the selected information displayed.

Here, each of the pieces of web data may include information indicating a feature of a different one of a plurality of products, and the information to be extracted that is indicated by the received instruction may be information indicating the feature.

According to the stated structure, the user is able to instruct so that characteristics of the products are extracted and displayed. Here, the characteristic of a product denotes a feature or property of the product. For example, in the case of a computer, the characteristic is performance, function or attribute of the computer, such as the operation frequency, the memory capacity, the display size, the CPU type, the manufacturer, the shape, or whether or not the computer has a television tuner. The type of computer can be specified according to the characteristic.

Accordingly, in a case in which the plurality of web pages present performance of operation frequency of various computers, the web data of each web page is obtained by the obtaining unit, an instruction for specifying the information indicated by the performance is received by the reception unit, and, as a result, the performance, such as the operational frequency, is extracted for each computer, and a screen is constructed using the extracted performance, and displayed.

Here, the obtaining unit may include; a search subunit operable to search the one or more web servers connected to the network for a plurality of web pages, based on a keyword input by the user, and the obtaining unit may obtain web data relating to web pages found by the search subunit as a result of the search.

According to the stated structure, the content of web pages extracted by the search unit can be limited.

Here, the obtaining unit may further include: a selection subunit operable to receive a selection of web pages from among the plurality of web pages found by the search subunit, and the obtaining unit may obtain web data relating to the selected web pages.

According to the stated structure, the user is able to select web pages as targets of extraction. Accordingly, information can be extracted even from web pages of product sales sites that are not registered at the product comparison site, according to user selection.

Here, the selection subunit may include: a web page display subunit operable to display each of the found plurality of web pages for a purpose of user selection.

According to the stated structure, the user is able to confirm and select web pages.

Here, the selection subunit may receive, in addition to the selection from among the plurality of web pages, a selection from the user of a portion of each of the web pages displayed by web page display subunit, and the obtaining unit may obtain web data of the web pages and the portions selected according to the selection subunit.

According to the stated structure, information can be limited to being extracted from a particular range of a web page that is the target of extraction. Therefore, for example, when information that is unrelated to the information to be extracted is included on the web page, if the user selects only the part of the information that is relevant, unnecessary search processing of the unrelated parts for extraction by the information display apparatus is eliminated, and information is extracted more accurately.

Here, the instruction received by the reception unit may indicate that the information to be extracted is the web data relating to the selected portions, and the display unit, according to the instruction, may create images, using pieces of web data that correspond respectively to the selected portions, each image corresponding to a different one of the pieces of web data, constructs the screen using the created images, and display the constructed screen.

According to the stated structure, the user is able to have each selected range displayed on one screen. For example, if the user selects a necessary range from each web page, the ranges are used to construct, and then display, one screen. This is effective when comparing information about products included in part of each page.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 1 is a block diagram showing the structure of an information display apparatus 100;

FIG. 2 shows an example of a search screen;

FIG. 3 shows an example of a table display screen;

FIG. 7 shows an example of storage content of a mark storage unit 160;

FIG. 8 shows an example of item groups of keywords and table display item selection lists;

FIG. 9 shows contents of an extraction program group;

FIG. 10 is a flowchart showing operations of the information display apparatus 100;

DESCRIPTION OF THE PREFERRED EMBODIMENT

Figure 4:
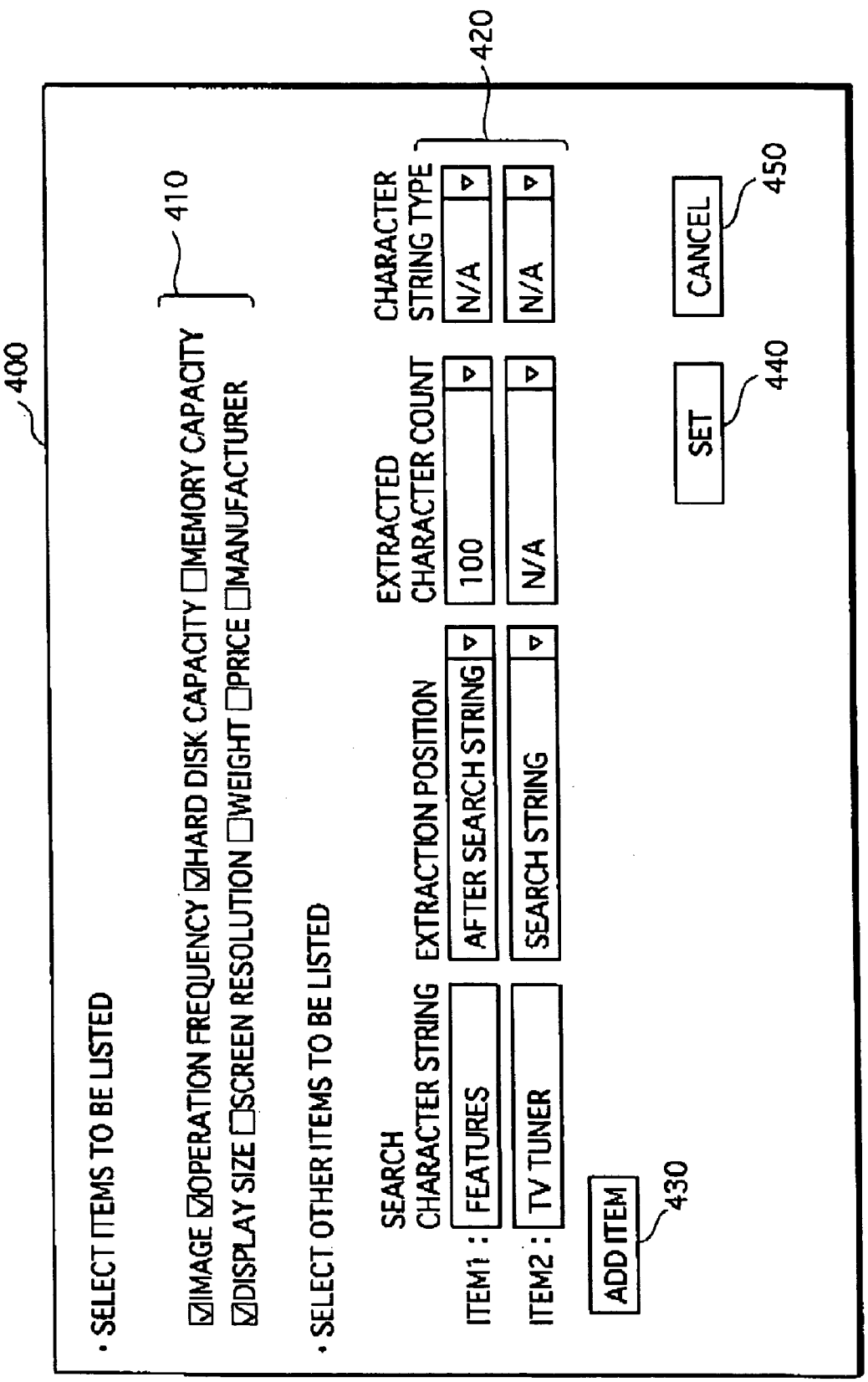
FIG. 4 shows an example of a table display setting screen.

The following describes an embodiment of the present invention with reference to the drawings.

FIG. 1 is a block diagram showing the structure of an information display apparatus 100.

The information display apparatus 100 shown in FIG. 1 is composed of an input unit 110 which is a keyboard, a mouse, or the like, a display unit 120 which is a CRT or the like, and an information display processing unit 130 which includes a CPU, a ROM, and a RAM which are not illustrated, and other compositional elements.

The information display processing unit 130 is connected to a network 155 which is, for example, the Internet. According to input from the input unit 110 by a user, the information display processing unit 130 searches web pages that are available on the network, extracts various types of information from the web pages, creates a display screen using the extracted information, and has the display unit 120 display the created screen.

<External Specifications>

Before describing the compositional elements of the information display processing unit 130, a description is given of external specifications with use of examples of screens displayed by the display unit 120 shown in FIGS. 2 to 4.

On receiving an instruction from the user to commence processing, the information display processing unit 130 displays a search screen. The search screen is primarily for searching web pages that list products that the user is considering purchasing, and for assisting selection from the web pages found as a result of the search.

FIG. 2 shows an example of the search screen.

As shown in FIG. 2, a search screen 200 is composed of a keyword input field 205, an address input field 235, an access button 240, a table display settings button 255, a search button 210, a mark button 245, a display table button 260, a search result display window 220, a web page display window 230, and a mark list display window 250.

The keyword input field 205 receives an input of a keyword from the user. The keyword is, for example, the name of a product that the user is considering purchasing. In FIG. 2, "computer" has been input.

When the search button 210 is clicked on with a mouse after the keyword has been input, the information display processing unit 130 searches for web pages including the input keyword, from one or more servers connected to the network 155, extracts the title of each web page found in the search, and displays a list of the titles in the search result display window 220. Each title is the character string portion between tags <TITLE> and </TITLE> in the HTML documents that composes the respective web page. In the example in FIG. 2, titles such as "Shop A-Computer Specialists ...", and "Shop B-Net sales of Computers ..." are displayed in the list.

When one of the titles in the displayed list is clicked on, specifically, when the title "Shop D-Computer Shop ..." in the example in FIG. 2 is clicked on, the information display processing unit 130 displays a rectangle 225 made up of a broken line, so as to surround the title, thereby indicating that the title has been clicked on. Simultaneously, the information display processing unit 130 displays the web page of the title "Shop D-Computer Shop ..." that has been clicked on, in the web page display window 230.

At this time, the URL of the web page being displayed is displayed in the address input field 235. Note that when the user inputs a URL into the address input field 235 and clicks on the access button 240, the information display processing unit 130 accesses the network 155, obtains the web page of the URL, and displays the obtained web page in the web page display window 230.

When the mark button 245 is clicked on while the web page is being displayed in the web page display window 230, the information display processing unit 130 adds the title of the web page to the mark list displayed in the mark list display window 250, and stores the web page in an internal memory.

Shop A, Shop B, and Shop D are displayed as the mark list in the example in FIG. 2. In other words, when the respective web pages of Shop A, Shop B, and shop D were displayed, the mark button 245 was clicked on, and each web page was stored in the internal memory.

When a product that the user is considering purchasing is listed on a web page that is being displayed by the title having been clicked on arbitrarily from among titles in the search results list, the user may add the web page to the mark list by clicking on the mark button 245. The product listed on the web page in the mark list is displayed in a table in a table display screen that is described below with FIG. 3, When table display settings described later with FIG. 4 have been set, and the display table button 260 is subsequently clicked on, the information display processing unit 130 displays a table display screen.

FIG. 3 shows an example of a table display screen.

A table display screen 300 in FIG. 3 is composed of a table 310, a table display settings button 320, and a search screen display button 330.

The table 310 is a table of the contents of various items for the products listed in the web pages in the mark list. The second to fifth columns from the left each correspond to a different one of the web page products. Eight items of information are shown for each product: the product name, an image, the operation frequency, the hard disk capacity, the display size, features, TV tuner (i.e., whether or not the product includes a TV tuner), and an address. The information for the items is extracted from the web pages in the mark list by the information display processing unit 130 according to an extraction program which are described later. When no information is able to be extracted, "N/A" is displayed for the corresponding item.

When any one of the operation frequency, hard disk capacity, display size, features, or TV tuner in the fields in the leftmost column is clicked on, the information display processing unit 130 rearranges the columns of the products using the item that has been clicked on as a key.

Specifically, when operation frequency is clicked on, the information display processing unit 130 rearranges the columns so that the products are displayed in descending order of operation frequency in the table 310. The result of the rearrangement is that the NPC100, whose operation frequency is 3.2 GHz, is displayed in the second column, the 2.5 GHz TVPC70 is displayed in the third column, the 2.3 GHz DPC17 is displayed in the fourth column, and the 1.1 GHz X300 is displayed in the fifth column. When operation frequency is subsequently clicked on once more, the information display processing unit 130 rearranges the columns of the products so as to be displayed in ascending order of operation frequency. In this way, the columns are rearranged in ascending order and descending order of operation frequency alternately each time the operation frequency field is clicked on.

Similarly, when the hard disk capacity field is click on, the columns of products are rearranged into descending order of hard disk capacity, and are rearranged into ascending order and descending order of hard disk capacity alternately each time the hard disk capacity field is clicked on.

This is the same for display size also.

When the TV tuner field is clicked on, the columns of the products are rearranged so that those with "YES" are on the left side and those with "NO" are on the right side. As a result, the columns of the products whose TV tuner field shows "YES", specifically, TVPC70 and NPC100, become the second and third columns, and the columns of products whose TV tuner field shows "NO", specifically, DPC17 and x300, become the fourth and fifth columns. When TV tuner is subsequently clicked on, the information display processing unit 130 switches the left columns with the right columns. As a result, the columns of products whose TV tuner field shows "NO" (DPC17 and X300) become the second and third columns, and the columns of the products whose TV tuner field shows "YES" (TVPC70 and NPC100) become the fourth and fifth columns.

In other words, in the case of an item expressed by numeric values, when the field of item name is clicked on, the columns of the products are rearranged in descending order of the values of the items, and further alternately rearranged in ascending order and descending order each time the field is clicked on. In the case of an item expressed by "YES" and "NO", when the field of item name is clicked on, the columns are rearranged so that those for which "YES" is indicated are on the left side and those for which "NO" is indicated are on the right side, and the left columns and the right columns are switched with each other when the field is further clicked on.

Furthermore, when the table display settings button 320 is clicked on in the table display screen, the information display processing unit 130 displays a table display setting screen described later, and when the search screen display button 330 is clicked on in the table display screen, the information display processing unit 130 displays the search screen.

The following describes table display settings.

When the table display settings button 255 shown in FIG. 2 or the table display settings button 320 shown in FIG. 3 is clicked on, the information display processing unit 130 displays a table display setting screen. The table display setting screen is for setting aspects of the display the table display screen of FIG. 3.

FIG. 4 shows an example of the table display setting screen.

A table display setting screen 400 in FIG. 4 is composed of a table display item selection list 410, a table display item input field 420, an add item button 430, a set button 440 and a cancel button 450.

The table display item selection list 410 has a check box before a character string of each item listed, the items being image, operation frequency, hard disk capacity, memory, display size, screen resolution, weight, price, and manufacturer. The user is able to select an item or items to have displayed in the table 310 in FIG. 3 by clicking one or more of the check boxes.

The table display item input field 420 is for the user to designate an items or items that are not included in the table display item selection list 410 and that he or she wishes to have extracted from web pages and displayed in the table 310. Each line corresponds to one item, and includes a search string input field, an extraction position selection field, an extracted character count input field, and a character string type selection field.

Like the item name, the search string input field comes either before or after an item, and is a field for receiving user input of a character string that is to be used as a search key for finding an item.

The extraction position selection field receives a user selection of one of "before search string", "after search string", and "search string".

If "before search string" is selected, a character string directly preceding the search string is extracted as the item. If "after search string" is selected, a character string directly proceeding the search string is extracted. Furthermore, it "search string" is selected, the search string itself is extracted. When "before search string" or "after search string" is selected and the search string cannot be found on a web page, "N/A" is displayed in that item as shown in the table 310.

The extraction character count input field is for receiving a designation of the number of characters in the item to be extracted from web pages. When the user does not wish to designate the character count, "N/A" may be selected from the pulldown list.

The character string type selection field is for receiving a user selection of the type of characters of the item to be extract from web pages, from a pulldown list that includes "kana" (Japanese syllabary), "kanji" (Chinese characters), and "alphabet". When the user does not wish to designate the character type, "N/A" may be selected from the pulldown list.

In the example in FIG. 4, Item 1 is designated such that a search string "features" is searched for and 100 characters after the search string are extracted.

Furthermore, Item 2 is designated such that a search string "TV tuner" is searched for and extracted.

Note that although in FIG. 4 the search string input field includes only one search string, i.e., TV tuner, the search string input field may be set so as to be able to receive input of a plurality of terms for an OR search. As one specific example, by inputting a term such as "television tuner" in addition to "TV tuner" with a comma, a space, or the like therebetween to express a break between the terms, character strings that satisfy either "TV tuner" or "television tuner" may be designated.

When the add item button 430 is clicked on, the information display processing unit 130 displays another item in the table display item input field 420 in addition to Item 1 and Item 2. This function is for user designation of an item or items to be further extracted in addition to Item 1 and Item 2.

When the set button 440 is clicked on, the information display processing unit 130 stores the content input by the user on the table display setting screen 400 in an internal memory, and then returns display to the search screen 200.

When the cancel button 450 is clicked on, the information display processing unit 130 returns display to the search screen 200 without storing content input by the user in the table display setting screen 400.

<Structure>

Returning to FIG. 1, the following describes structural elements of the information display processing unit 130 of the information display apparatus 100 having the described specifications.

The information display processing unit 130, as shown in FIG. 1, is composed of a search screen construction unit 140, a communication unit 150, a mark storage unit 160, a setting screen construction unit 170, a setting content storage unit 180, and a the table display screen construction unit 190.

The search screen construction unit 140 displays a search screen as shown as an example in FIG. 2, receives input operations with respect to the search screen from the input unit 110, and performs processing according to the input instructions.

In particular, when a keyword is input into the keyword input field 205 and the search button 210 is clicked on, the search screen construction unit 140 passes the keyword to the communication unit 150, has the communication unit 150 search for web pages, and displays a list of titles of the search results in the search result display window 220. Furthermore, the search screen construction unit 140 has a web browser function, and when a title is clicked on, displays the web page of the title in the web page display window 230. Here, web page denotes one unit of display in a window or the like, and web browser function denotes a function for analyzing a layout from data that composes a web page, such as HTML, text, and image files, constructing a web page therefrom, and displaying the constructed web page. Furthermore, when the mark button 245 is clicked on, the search screen construction unit 140 stores the currently-displayed web page currently in the mark storage unit 160, and adds the title of the web page to the mark list display window 250.

In addition, when the table display settings button 255 is clicked on, the search screen construction unit 140 activates the setting screen construction unit 170 which displays the table display setting screen. When the display table button 260 is clicked on, the search screen construction unit 140 activates the table display screen construction unit 190 which creates and displays the table display screen.

Furthermore, when the set button 440 is clicked on in the table display setting screen, or when the search screen display button 330 is clicked on in the table display screen, the search screen construction unit 140 activates and displays the search screen. Here, the search screen construction unit 140 reproduces and displays the most recent display state of the search results, the web page, and the mark list. For this reason, each time the screen moves from the search screen to another screen, the search screen construction unit 140 saves the display state of the search screen for the next display of the search screen.

The search screen construction unit 140 also displays the URL of the currently-displayed web page in the address input field 235. Furthermore, when a URL is input into the address input field 235 and the access button 240 is clicked on, the search screen construction unit 140 passes the URL to the communication unit 150, has the communication unit 150 obtain the web page, and displays the obtained web page in the web page display window 230.

On receiving a keyword from the search screen construction unit 140, the communication unit 150 accesses the one or more web servers on the network, searches for web pages that include the keyword, and returns search results to the search screen construction unit 140. Here, as the search results, the communication unit 150 may pass all data for the web pages found as a result of the search to the search screen construction unit 140, or may extract and pass only the titles of the web pages in order for the search screen construction unit 140 to display the titles in the search result display window 220. In the case of passing only the titles, the communication unit 150 receives an instruction from the search screen construction unit 140 when one of the titles in the search result display window 220 is subsequently clicked on, obtains the web page corresponding to the title from the network 155, and passes the obtained web page to the search screen construction unit 140.

The communication unit 150 may request a search engine on the network 155 to perform the web page search, or may directly search contents of web pages registered with the web servers itself.

Furthermore, when receiving a URL from the search screen construction unit 140, the communication unit 150 obtains the web page of the URL, and passes the obtained web page to the search screen construction unit 140.

When the mark button 245 is clicked on, the mark storage unit 160 obtains the currently-displayed web page from the search screen construction unit 140, and stores the obtained web page.

Figures 5A, 5B:
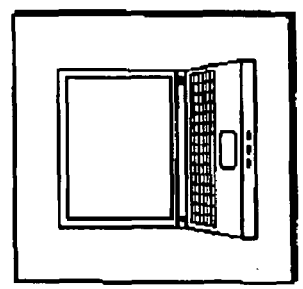
FIG. 5A and FIG. 5B show an example of data that composes one web page stored in a mark storage unit 160.

FIGS. 5A and 5B show examples of data that composes one web page stored in the mark storage unit 160.

The data composes the web page displayed in the web page display window of FIG. 2.

FIG. 5A shows an HTML document. As shown in FIG. 5A, this HTML document includes a title 510 that includes the shop name and web page introductory sentence displayed in FIG. 2, an image file name 520, and text and the like 530 that indicates items of various functions of the computer.

FIG. 5B is a file of an image of a computer, and corresponds to the image file name 520.

Here, the mark storage unit 160 stores structural data of the web page of the title that has been clicked on in the search result display window 220, however, instead of storing the whole data of the web page, the mark storage unit 160 may store only a selected portion of the web page.

Figure 6:
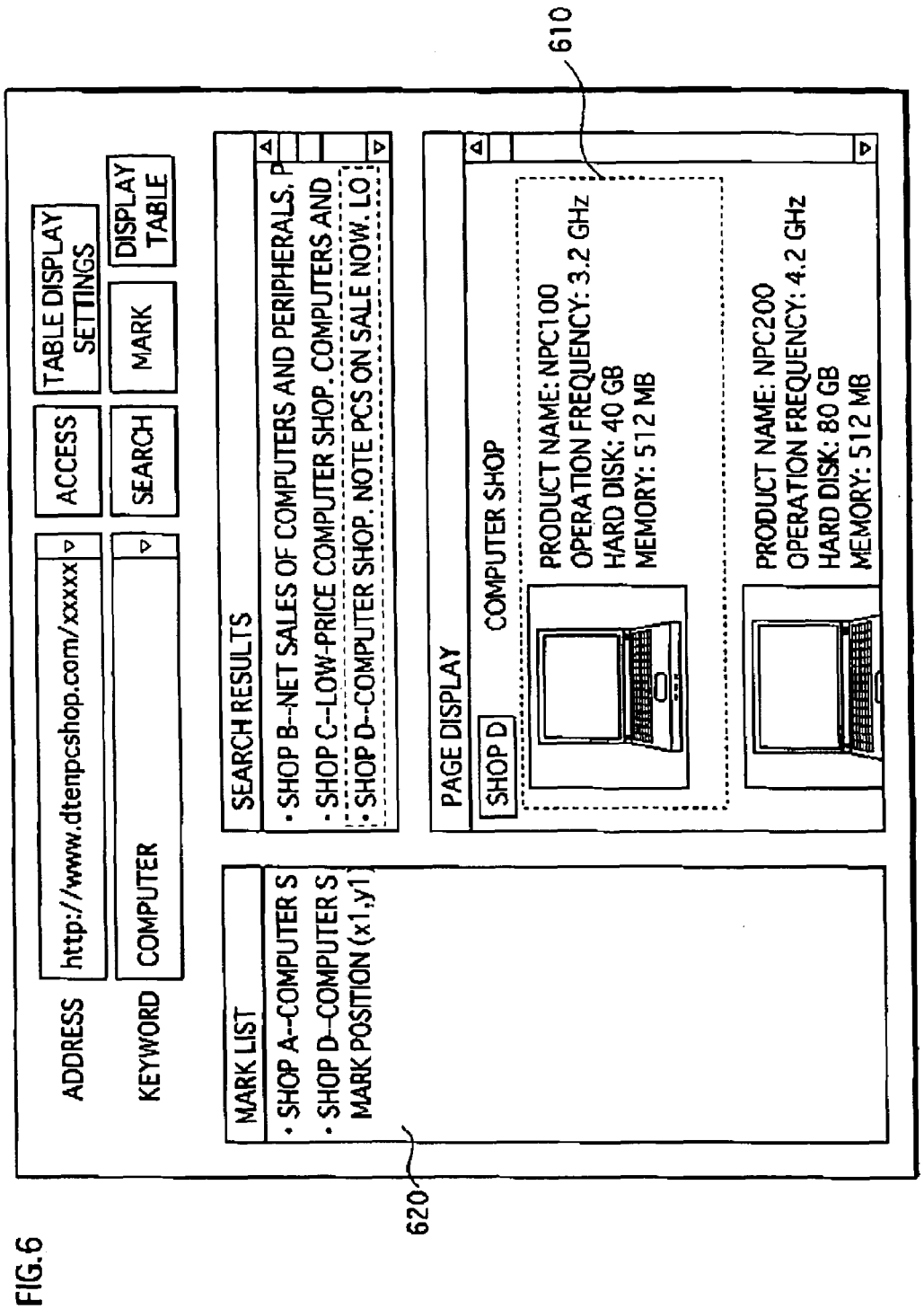
FIG. 6 shows an example of a selected portion of a web page displayed on the search screen.

FIG. 6 shows a search screen as one example.

As shown in FIG. 6, when a portion of the displayed web page is selected according to a mouse drag operation or the like, the search screen construction unit 140 indicates the selected range with a broken line rectangle 610. When the mark button 245 is clicked on in this state, the search screen construction unit 140 obtains coordinates showing the range of the rectangle 610 on the web page, and displays this range of the web page together with the title (620 in FIG. 6). Next, the search screen construction unit 140 extracts text, an image file and HTML data that corresponds to the information displayed in the rectangle 610, and stores the text, image file and HTML data in the mark storage unit 160.

FIG. 7 shows an example of the storage contents of the mark storage unit 160.

As shown in the second row in FIG. 7, when storing the contents of FIGS. 5A and 5B, which are the compositional data of one web page, the mark storage unit 160 stores the data in correspondence with the URL of the web page. Furthermore, as shown in the third row, when storing the portion of the web page selected according to the rectangle 610, the mark storage unit 160 stores the data corresponding to the portion, the URL of the web page, and the coordinate position of the rectangle 610.

When the table display settings button 255 is clicked on, the setting screen construction unit 170 is activated, and displays a category input screen (not illustrated). The setting screen construction unit 170 then displays a table display setting screen such as the example in FIG. 4, according to the category indicated by an input character string. The setting screen construction unit 170 stores the setting contents input on the screen in the setting contents storage unit 180.

Specifically, the setting screen construction unit 170 constructs and displays a setting screen with different items in the table display item selection list 410, in accordance with categories of a keyword input in the category input screen. For this reason, the setting screen construction unit 170 stores, for each category, a group of terms that may possibly be input into the category input screen, in correspondence with a table display selection list to be displayed on the setting screen, in an internal memory.

FIG. 8 shows an example of the contents of the internal memory of the setting screen construction unit 170.

As shown in FIG. 8, the setting screen construction unit 170 stores categories respectively in correspondence with item groups. As an example, one category is made up of terms such as computer, personal computer, PC, notebook computer, notebook PC, desktop, which are identical or similar in meaning to personal computer. The items include, for example, operation frequency, hard disk capacity, memory capacity, display size, screen resolution, weight, price, and manufacturer.

Furthermore, the setting screen construction unit 170 stores a category of made up of terms that are the same as or similar to digital camera, specifically, digital camera, digicam, camera, and so on. This category is in correspondence with an item group including lens, optical zoom, effective pixel count, LCD monitor, video recording, audio recording, battery recharge, size, weight, price, and manufacturer.

In addition to those described, the setting screen construction unit 170 also stores other terms and items in correspondence for other categories.

When a keyword is input into the category input screen, the setting screen construction unit 170 searches the internal memory, using the keyword as a key, in order to specify the category, and displays the item group corresponding to the specified category on the table display setting screen. For example, if the keyword is "computer", the setting screen construction unit 170 specifies the category as being personal computer because the term "computer" is recorded in that category, and displays the item group made up of operation frequency, hard disk capacity, memory capacity, display size, screen resolution, weight, price, and manufacturer in the table display item selection list 410 as shown in the table display setting screen 400 in FIG. 4. Note that the item "image" in the table display item selection list 410 is displayed there regardless of the category.

When user input is received with respect to the check boxes in the table display item selection list 410 and the table display item input field 420 on the table display setting screen, and the set button 440 is clicked on, the setting screen construction unit 170 stores the input setting content in the setting content storage unit 180.

When, for example, the set button 440 is clicked on in the table display setting screen 400 of FIG. 4, the setting screen construction unit 170 stores image, operation frequency, hard disk capacity, and display size, which are the items in the table display item selection list 410 whose check boxes have been checked, and stores the search string "features", the extraction position "after search string", the extraction character count "100", and the character string type "N/A", which have been input in Item 1 in the table display item input field 420, and stores the search string "TV tuner", the extraction position character stringy, the extraction character count "N/A", and the character string type "N/A", which have boon input in Item 2.

After storing, the setting screen construction unit 170 activates the search screen construction unit 140, and has the search screen displayed In addition, when the table display settings button 320 shown in FIG. 3 is clicked on, the setting screen construction unit 170 activates, and displays the table display setting screen. Here, the setting screen construction unit 170 reads the stored content from the setting content storage unit 180, and reproduces the setting content on the screen.

The table display screen construction unit 190 extracts extraction items indicated by the setting content stored in the setting content storage unit 100, from the web pages, or the portions thereof, stored in the mark storage unit 160, creates a table in which the extracted items are arranged for each product, and displays a table display screen such as the example in FIG. 3.

In order to extract the items, the table display screen construction unit 190 stores different extraction program groups corresponding to categories of keywords input into the category input screen. Specifically, in the storage contents, each category corresponds to a different one of program groups. The program included in each program group corresponds to a different one of the items in the table display item list for each category shown in FIG. 8, and is for performing processing for extracting the items.

FIG. 9 shows content of the extraction program group of the computer category.

The extraction program group shown in FIG. 9 corresponds to the item group of the table display item list in the computer category in FIG. 8.

The left column in FIG. 8 indicates the items in the table display item selection list (operation frequency, hard disk capacity, memory, etc.), and the right column indicates the content of programs for extracting the content of respectively corresponding items.

The table display screen construction unit 190 executes an extraction program corresponding to an extraction item indicated by the setting content stored in the setting content storage unit 180, and extracts the item.

For example, when the setting content indicates that operation frequency is to be extracted, the table display screen construction unit 190 searches for character strings "frequency" or "operation frequency", as shown in FIG. 9, in each web page, or selected portion thereof, stored in the mark storage unit 160, and if such character strings arc found, extracts the proceeding numbers. Here, if such character strings are not found, the mark storage unit 160 further searches for character strings "GHz", "Giga Hz", "Gigahertz", and "G Hertz", and extracts the number strings preceding these character strings. As one example, if the HTML document in FIG. 5A is being extracted from, since "operation frequency: 3.2 GHz" appears in the text 530, the table display screen construction unit 190 finds the character string "operation frequency" according to the search, and extracts the proceeding number string "3.2".

In addition to the described extraction programs, the table display screen construction unit 190 performs extraction of product names, URLs, and image files, and performs extraction according to the input content of the table display item input field 420.

For a product name, the table display screen construction unit 190 extracts a character string proceeding "product name", "name", or "model number". For a URL, since the mark storage unit 160 stores the URL in correspondence with the web page data, or a portion thereof, the table display screen construction unit 190 reads the URL from the mark storage unit 160. For an image file, the table display screen construction unit 190 extracts the image file name listed in the web page, and reads the corresponding image file.

Furthermore, following the input content of the table display item input field 420, the table display screen construction unit 190 extracts, for example, a 100-character character string proceeding the search string "features", or extracts the character string of the search string "TV tuner".

Note that while extraction of input content of the table display item input field 420 is described as being that of a character string before or after the search string, or the search string itself, the extraction is not limited to being performed in this way. As other examples, the table display screen construction unit 190 may extract a character string one line below the search string, or, when the display contents of a web page are displayed in table format, the table display screen construction unit 190 may extract character string from a field above, below, left or right of the search string. In other words, the table display screen construction unit 190 is structured so as to extract a character string having a predetermined positional relationship with the search string.

In this way, the table display screen construction unit 190 extracts items, product names, URLs, and image files set as setting content, from the web pages, or selected portions thereof, stored in the mark storage unit 160, creates a table of the products with use of the items obtained as a result of extracting, composites the table with other images of the table display screen, and displays the resultant screen. Note that when creating the table, the table display screen construction unit 190 may add character strings as appropriate. For example, when listing number strings of operational frequencies in the table, the table display screen construction unit 190 may add "GHz", which is the unit of operation frequency, after the number string. Furthermore, in the case of hard disk capacity, the table display screen construction unit 190 may add "GB" after the number string, or in the case of display size, the table display screen construction unit 190 may add "inch" after the number string. For this purpose, the table display screen construction unit 190 may store a character string to be added, and a position where the character string is to be added, for each predetermined item, so that in the case of operation frequency for example, GHz is added to the end of the extracted number string.

Furthermore, when a field of an item in the left column of the table is clicked on, the table display screen construction unit 190 rearranges columns of the products using the clicked item as a key.

Specifically, when the content of the item is expressed by numeric values, such as operation frequency, memory capacity, and hard disk capacity, the table display screen construction unit 190 compares the size of the numeric values of the products, and rearranges the columns so that the products are displayed in descending order or ascending order of the numerical values.

When the content of the item is expressed by "YES" or "NO", the table display screen construction unit 190 rearranges the columns so that the products for which "YES" is listed are displayed on the left, and products for which "NO" is listed are displayed on the right.

For each type of rearrangement of item, when the content of the item "N/A", the column for the product is displayed on the right.

Furthermore, when the table display settings button 320 is clicked on, the table display screen construction unit 190 activates the setting screen construction unit 170, and has the table display setting screen displayed. When the search screen display button 330 is clicked on, the table display screen construction unit 190 activates the search screen construction unit 140, and has the search screen displayed.

The search screen construction unit 140, which has stored the most recent display content in the internal memory, reads and displays this display content when the button 330 is clicked on.

<Operations>

The following describes operations of the information display apparatus 100 having the described structure.

FIG. 10 is a flowchart showing operations of the information display apparatus 100.

As shown in FIG. 10, on the information display apparatus 100 being activated, the search screen construction unit 140 activates and displays the search screen 200 (step S1000).

Next, the search screen construction unit 140 monitors input operations to the input unit 110, and performs the following processing according to detected input operations (step S1005).

When a keyword "computer" is input into the keyword input field 205 and the search button 210 is clicked on (step S1010: YES), the search screen construction unit 140 passes the keyword "computer" to the communication unit 150, and has the communication unit 150 search for web pages. Having received the keyword "computer", the communication unit 150 searches for web pages containing the keywords "computer", using search engines of the one or more web servers connected to the network 155, and passes web pages found as a result of the search to the search screen construction unit 140 (step S1015), Having received the search results, the search screen construction unit 140 displays a list of titles of the obtained web pages in the search result display window (step S1020).

When one of the listed web page titles is clicked on (step S1025: YES), the search screen construction unit 140 displays the rectangle 225 so as to surround the title that has been clicked on, and displays the web page corresponding to the title in the web page display window 230 (step S1030).

When a portion of the web page is designated according to the rectangle 610 while a web page is displayed in the web page display window as in FIG. 6 (step S1035: YES), the search screen construction unit 140 specifies and obtains the data corresponding to the portion, from the data composing the web page (step S1040).

When the mark button 245 is clicked on (step S1045: YES), the mark storage unit 160 stores data corresponding to the web page currently displayed, or the portion that is the range selected according to the rectangle 610, in the web page display window 230 (step S1050).

When the table display settings button 255 is clicked (step S1055; YES), the search screen construction unit 140 displays the category input screen, and, using the storage content shown in FIG. 8, specifies the table display item selection list corresponding to the category indicated by the input keyword. In the present example, when "computer" is input in the category input screen, the items displayed in the table display item selection list are, from FIG. 8, operation frequency, hard disk capacity, memory capacity, display size, screen resolution, weight, price, and manufacturer.

Next, the setting screen construction unit 170 creates the table display setting screen 400 using the specified table display item selection list, and displays the table display setting screen 400 (Step S1060).

When check boxes in the table display item selection list 410 are checked, Item 1 and Item 2 of the table display item input field 420 are input into as shown in the table display setting screen 400, and the set button 440 is clicked on, the setting screen construction unit 170 stores the input content in the setting content storage unit 180 (step S1065). The setting screen construction unit 170 then activates the search screen construction unit 140, and has the search screen 200 displayed.

When the display table button 260 is clicked on (step S1070: YES), the search screen construction unit 140 activates the table display screen construction unit 190. The activated table display screen construction unit 190 creates and displays the table display screen 300 according to procedures shown in FIG. 11 (step S1075). Next, if an item field in the left column of the table 310 is clicked on, the table display screen construction unit 190 rearranges the columns of the products according to the content of the item that was clicked on, and if the table display settings button 320 is clicked on, the table display screen construction unit 190 activates the setting screen construction unit 170 and has the setting screen displayed, and if the search screen display button 330 is clicked on, the table display screen construction unit 190 activates the search screen construction unit 140 and has the search screen displayed (step S1080). If an end operation is made by the user during this processing (step S1085: YES), the table display screen construction unit 190 ends the processing shown in FIG. 10.

Furthermore, if an end operation is made by the user while the search screen 200 is being displayed (step S1090: YES), the search screen construction unit 140 ends the processing shown in FIG. 10.

Figure 11:
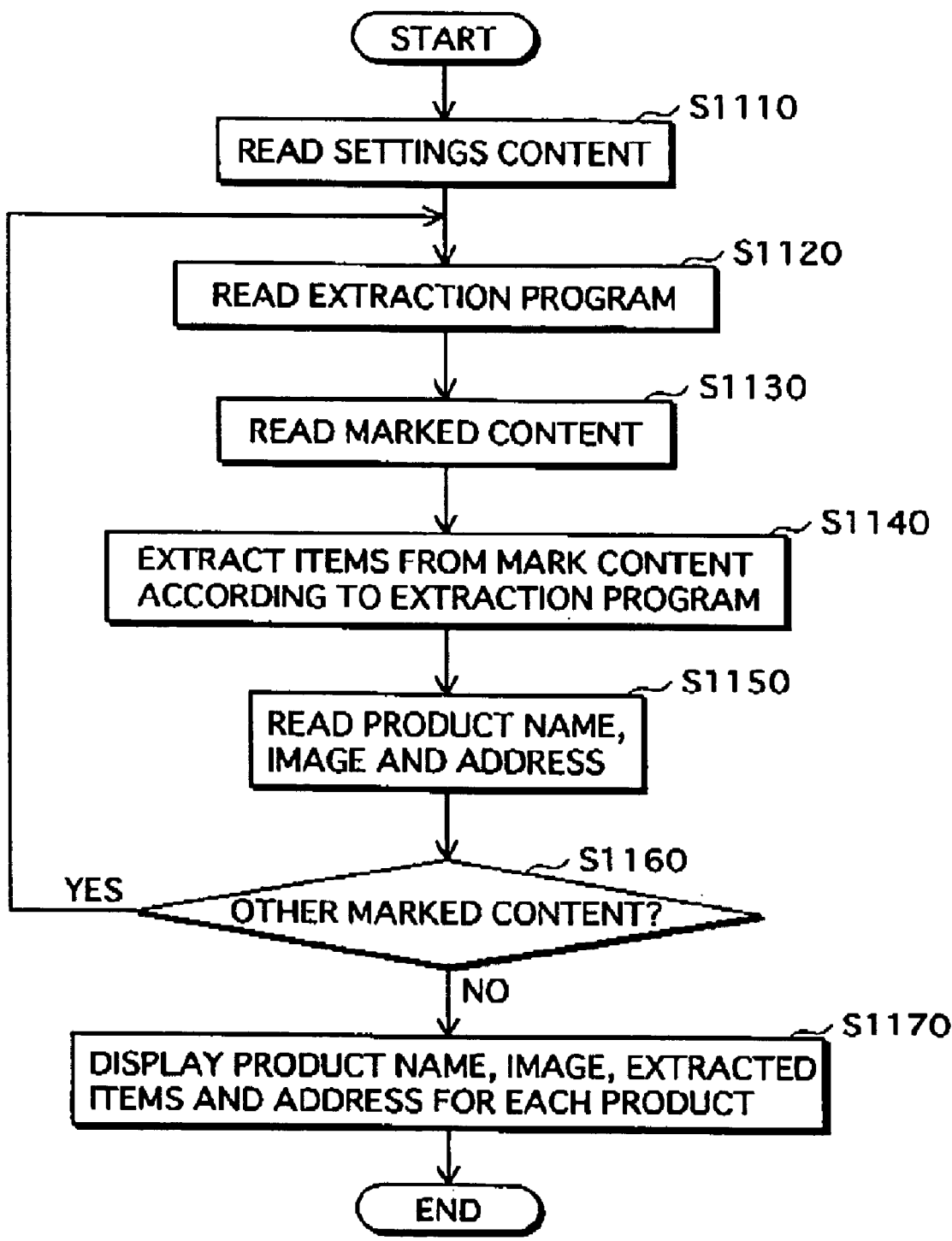
FIG. 11 is a flowchart showing details of processing at step S1075 in FIG. 10.

FIG. 11 is a flowchart showing details of the processing at step S1075 in FIG. 10. In FIG. 11, on being activated by the search screen construction unit 140, the table display screen construction unit 190 reads the setting content from the setting content storage unit 180 (step S1110).

Next, the table display screen construction unit 190 reads an extraction program group corresponding to the category of the keyword input in the category input screen, from among the internally-stored extraction program groups (step S1120). Here, since the keyword is "computer", the content of the extraction program group corresponding to the category is that shown in FIG. 9. The table display screen construction unit 190 reads, from the extraction program group, only the extraction programs corresponding to the items set in the setting content in the setting content storage unit 180, and constructs a program corresponding to the setting content.

Next, the table display screen construction unit 190 reads data of either the web page data or the selected portion data from the mark storage unit 160 (step S1130).

The table display screen construction unit 190 then extracts the item from the read web page data or selected portion data, using the extraction program constructed at step S1120.

Here, the table display screen construction unit 190 performs extraction in accordance with the content input into the table display item input field 420 (step S1140).

Furthermore, the table display screen construction unit 190 extracts the product name, the URL, and the image file (step S1150).

If unprocessed web page data or selected portion data remains in the mark storage unit 160, the table display screen construction unit 190 performs processing from step S1120 to step S1150 with respect to the remaining data (step S1160).

After having extracted the items of the setting contents from each web page data and each selected portion data in this way, the table display screen construction unit 190 creates the table 310 in which the product name, image and extracted item of each setting content are arranged for each product, constructs the table display screen 300 using the table 310, and displays the constructed table display screen 300 (step S1170).

Although a preferred embodiment of the present invention has been described, the present invention is not limited to the described structure. Structures such as the following are possible.

(1) Instead of obtaining data of the portion corresponding to the information displayed in the rectangle 610, the mark storage unit 160 may obtain and store pixel information displayed in the rectangle 610.

(2) In the present embodiment, extraction of items designated in the setting content is performed by executing an extraction program, and displaying the executed items in the table. When the user wishes to have other items displayed, the user has the table display screen displayed and designates items, an the extraction program for the newly designated items is executed, and the newly extracted items are displayed in the table. Instead of executing an extraction program in this way each time an item is designated, the information display apparatus 100 may be structured so that when the extraction program is first executed, the extraction program is executed not only for the items designated in the setting content, but also for items that are not designated. This enables execution of the extraction program to be omitted when subsequent re-setting is performed, and reduces the amount of time required to display the items.

(3) Instead of a category input screen, the setting screen construction unit 170 may display different table display setting screens depending on the category indicated by the keyword input into the keyword input field 205.

(4) Although the setting screen construction unit 170 displays a category input screen, and the item group for the table display item selection list 410 is specified according to the keyword input into the category input screen, an alternative structure is one in which the setting screen construction unit 170 displays the item groups in the internal memory shown in FIG. 8, and has the user select one of the item groups, thereby specifying the item group.

(5) Although setting must be performed in the table display setting screen before displaying the table display screen in the present embodiment, it is possible to have a structure in which the table display screen in displayed without setting being performed. For this purpose, the table display screen construction unit 190 executes a predetermined item extraction program with respect to the web pages and the data of the selected portions stored in the mark storage unit 160, extracts various items, and displays a list of the extracted items. Alternatively, the table display screen construction unit 190 stores different item extraction programs for each category, and when display of the table display screen is instructed, requests a designation of the category from the user, executes the item extraction program corresponding to the designated category, extracts the item, and displays a table of the extracted items.

(6) In the present embodiment, the table display screen construction unit 190 extracts, for example, extraction items from portions of the text and the like 530 in FIG. 5A. The text portion 530 is the character string itself that is displayed on the screen, as shown by the web page display window 230 in FIG. 2. In other words, in the case of this example, the table display screen construction unit 190 extracts items from the character string that is displayed on the screen, from the data that composes the web pages. However, the table display screen construction unit 190 may instead extract items from portions of the data that composes the web pages, other than the character strings that are displayed on the screen.

For example, the table display screen construction unit 190 may extract items from the character string between comment tags. In HTML, character strings written between comment tags, specifically, <!-- and -->, are not displayed on the screen. If, in addition to data for the web page, the administrators of product sales sites use these comment tags to write a character string of extraction items or the like in a common format corresponding to an item extraction algorithm of the information display apparatus, the information display apparatus can easily extract items from the web page data of the product sales sites.

Figure 12:
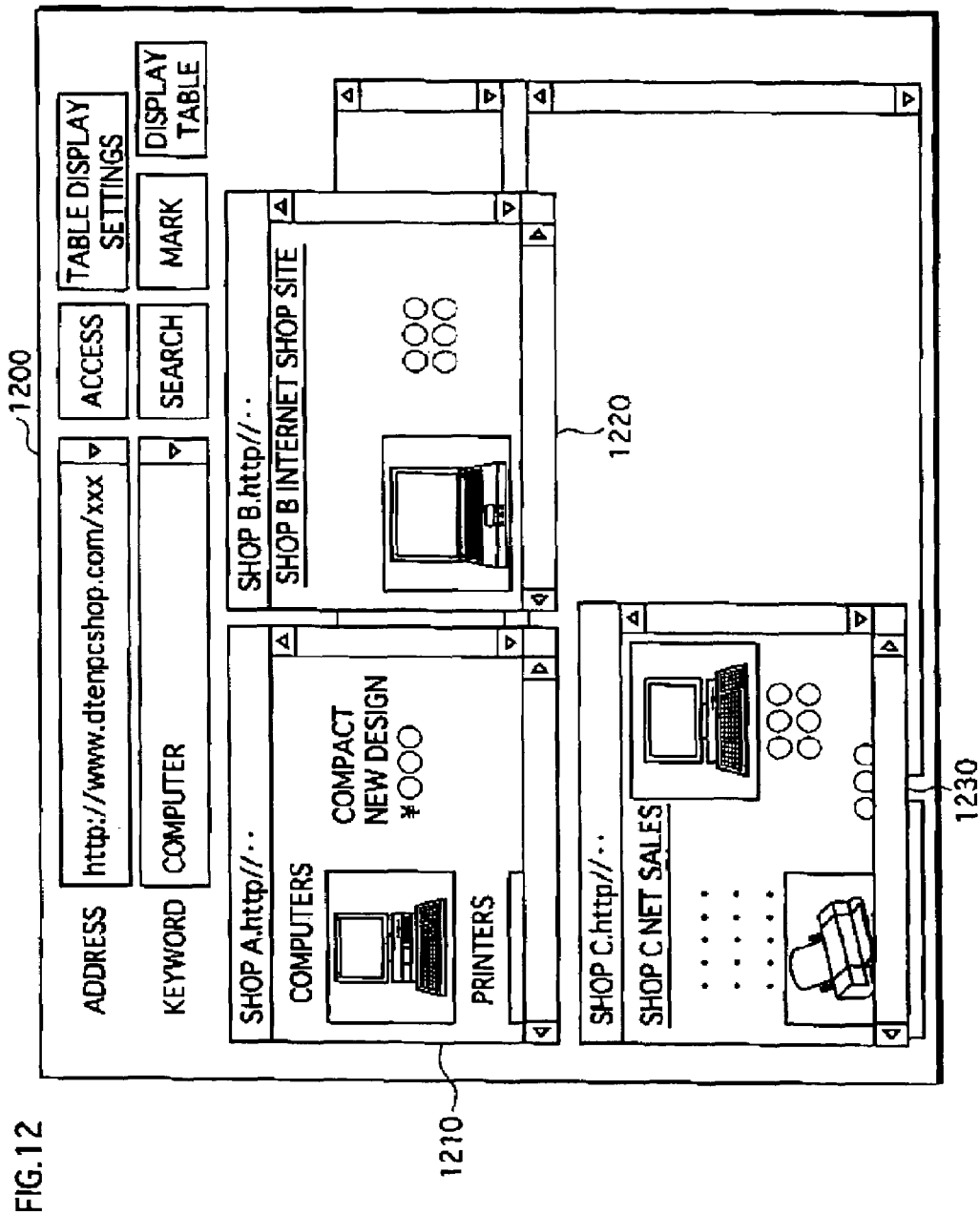
FIG. 12 is a first modification example of the table display screen.

(7) Instead of the table display screen 300 shown in FIG. 3, the table display screen construction unit 190 may create and display a table display screen 1200 shown in FIG. 12. In the table display screen 1200, windows 1210, 1220 and 1230 are displayed on the search screen 200. The images displayed in the windows 1210, 1220 and 1230, respectively, correspond to images of portions of web pages selected by clicking on the mark button 245 when the search screen 200 is being displayed, as shown by the rectangle 610 in FIG. 6. The windows 1210, 1220 and 1230 each have scroll bars, and the display area of each web page may be moved up, down, loft and right in order to confirm areas of the web page other than the selected portion.

In order to achieve this, when a portion of a web page is selected and the mark button 245 is clicked on which the rectangle 610 is being displayed, the search screen construction unit 140 obtains the coordinates indicating the rectangle 610 on the web page, and displays the coordinates together with the title (620 in FIG. 6). The search screen construction unit 140 then stores the coordinate positions of the selected portion and the URL of the web page in the mark storage unit 160.

The mark storage unit 160 stores a plurality of sets of coordinate positions of selected portions and respective web page URLs.

When the display table button 260 is clicked on in the search screen 200, the table display screen construction unit 190 is activated, and reads sets of coordinate positions of selected portions and web page URLs thereof from the mark storage unit 160. The table display screen construction unit 190 instructs the communication unit 150 to obtain the web page of the URL of one sets, and generates a web page image in such a manner that the portion indicated by the coordinate position is displayed in the window 1210. The table display screen construction unit 190 performs the same processing for the other sets, and displays the selected portions in order in the window 1220 and the window 1230.

Figure 13:
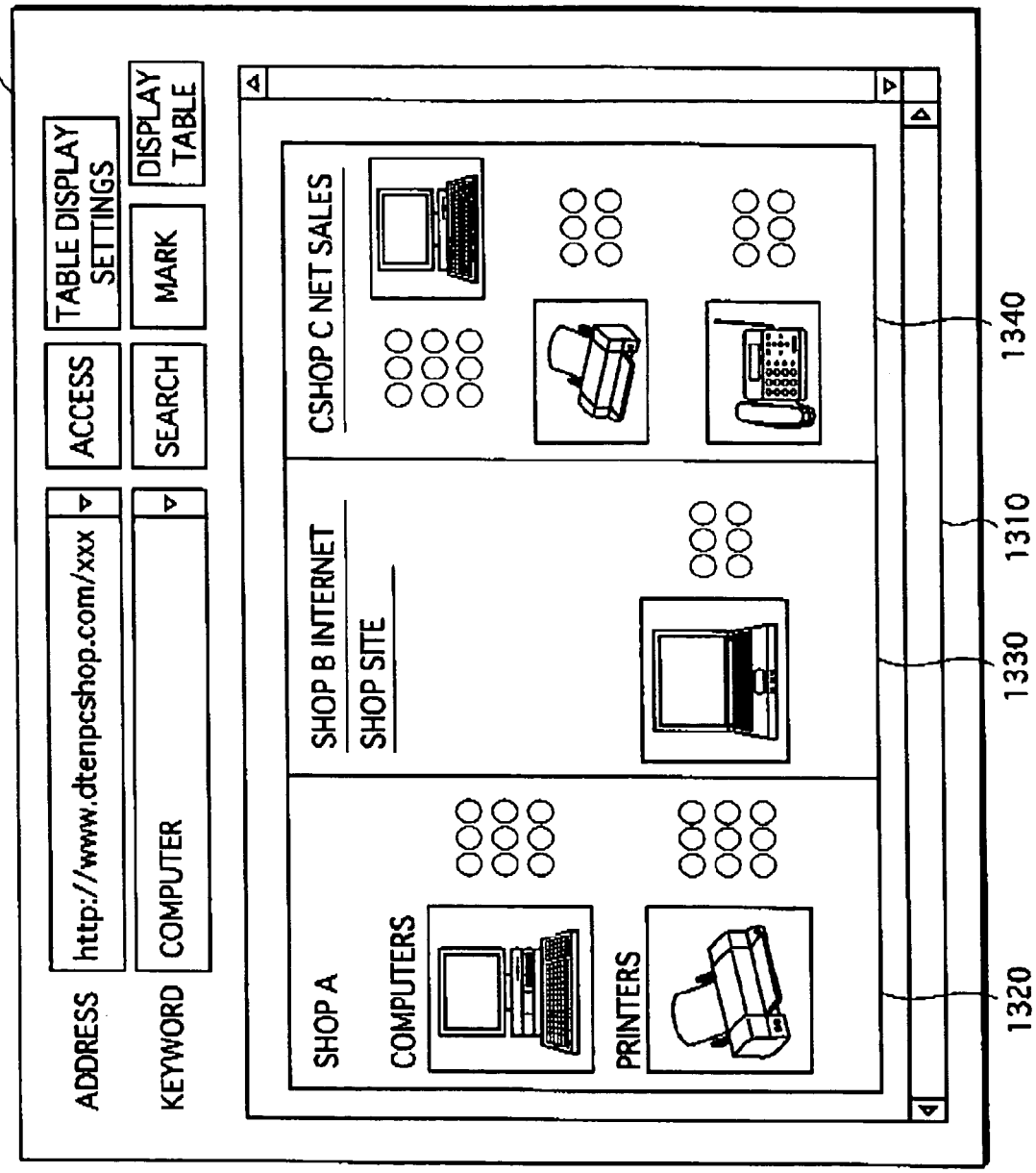
FIG. 13 is a second modification example of the table display screen.

(8) Instead of the table display screen 300, the table display screen construction unit 190 may create and display a table display screen 1300 shown in FIG. 13. In the table display screen 1300, a window 1310 is displayed on the search screen 200, and rectangles 1320, 1330 and 1340 are displayed in the window 1310. The respective images displayed in rectangles 1320, 1330 and 1340 correspond to images of portions of web pages selected by clicking on the mark button 245 when the search screen 200 is being displayed, as shown by the rectangle 610 in FIG. 6.

The structure of the search screen construction unit 140 and the mark storage unit 160 in order to realize this is similar to that described above in (7), but the way in which the table display screen construction unit 190 displays is different.

Specifically, when the display table button 260 is clicked on, the table display screen construction unit 190 is activated, and displays the window 1310 on the search screen 200. The table display screen construction unit 190 reads a set of the coordinate position of a selected portion and the URL thereof from the mark storage unit 160, instructs the communication unit 150 to obtain the web site of the URL, and creates a web page image in such a manner that the portion indicated by the position coordinates in displayed in the rectangle 1320. The table display screen construction unit 190 performs the same processing for the other sets, and displays the selected portions in order in the rectangles 1330 and 1340.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An information display apparatus, comprising:
    an obtaining unit operable to obtain, from one or more web servers connected to a network, a plurality of pieces of web data, each piece of web data composing either a portion of or a whole web page;
    a reception unit operable to receive, from a user, an instruction for specifying information to be extracted from each of the obtained pieces of web data, the instruction showing (i) a predetermined character string that is a display item in a list and that is in association with the information to be extracted, (ii) a relative positional relationship in web data between the information to be extracted and the predetermined character string, and (iii) a character count of the information to be extracted; and
    a display unit operable to
        search each of the obtained pieces of web data for the predetermined character string,
        extract, based on the character count, information from web data in the relative positional relationship with the predetermined character string found as a result of the search,
        construct, with use of the extracted information, a list having a heading item that is the predetermined character string, and
        display the constructed list.

2. The information display apparatus of claim 1, wherein the reception unit includes:
    a candidate storage subunit operable to store in correspondence, for each of a plurality of candidates for the information to be extracted, a name expressing the information to be extracted and the instruction for specifying the information to be extracted; and
    a candidate selection subunit operable to present the names stored in the candidate storage subunit to the user, and have the user select one or more of the names, and
    the reception unit, for each of the one or more selected names, reads the instruction corresponding to the name, and receives the read instruction as the instruction from the user.

3. The information display apparatus of claim 2, wherein the plurality of candidates for information to be extracted are sorted into a plurality of categories, the candidate storage subunit stores the name and instruction of each candidate in correspondence with the category of the candidate, and the candidate selection subunit receives a designation of one of the categories from the user, reads the names in the designated category from the candidate storage subunit, presents the read names to the user, and has the user select one or more of the names.

4. The information display apparatus of claim 1, wherein each of the pieces of web data includes information indicating a feature of a different one of a plurality of products, and the information to be extracted that is indicated by the received instruction is information indicating the feature.

5. The information display apparatus of claim 1, wherein the obtaining unit includes:

a search subunit operable to search the one or more web servers connected to the network for a plurality of web pages, based on a keyword input by the user, and the obtaining unit obtains web data relating to web pages found by the search subunit as a result of the search.

6. The information display apparatus of claim 5, wherein the obtaining unit further includes:

a selection subunit operable to receive a selection of web pages from among the plurality of web pages found by the search subunit, and the obtaining unit obtains web data relating to the selected web pages.

7. The information display apparatus of claim 6, wherein the selection subunit includes:

a web page display subunit operable to display each of the found plurality of web pages for a purpose of user selection.

8. The information display apparatus of claim 7, wherein the selection subunit receives, in addition to the selection from among the plurality of web pages, a selection from the user of a portion of each of the web pages displayed by web page display subunit, and the obtaining unit obtains web data of the web pages and the portions selected according to the selection subunit.

9. The information display apparatus of claim 8, wherein the instruction received by the reception unit indicates that the information to be extracted is the web data relating to the selected portions, and the display unit, according to the instruction, creates images, using pieces of web data that correspond respectively to the selected portions, each image corresponding to a different one of the pieces of web data, constructs the screen using the created images, and displays the constructed screen.

10. An information display method used in an information display apparatus, the method comprising:

an obtaining step for obtaining, from one or more web servers connected to a network, a plurality of pieces of web data, each piece of web data composing either a portion of or a whole web page;

a reception step for receiving, from a user, an instruction for specifying information to be extracted from each of the obtained pieces of web data, the instruction showing (i) a predetermined character string that is a display item in a list and is in association with the information to be extracted, (ii) a relative positional relationship in web data between the information to be extracted and the predetermined character string, and (iii) a character count of the information to be extracted; and a display step for
searching each of the obtained pieces of web data for the predetermined character string, extracting, based on the character count, information from web data in the relative positional relationship with the predetermined character string found as a result of the search, constructing, with use of the extracted information, a list having a heading item that is the predetermined character string, and displaying the constructed list.

11. The information display method of claim 10, wherein the obtaining step includes:

a search substep for searching the one or more web servers connected to the network for a plurality of web pages, based on a keyword input by the user, and a selection substep for receiving a selection of web pages from among the plurality of web pages found in the search substep, and in the obtaining step, web data relating to the selected web pages is obtained.

12. An information display method used in an information display apparatus, the method comprising:

an obtaining step for obtaining, from one or more web servers connected to a network, a plurality of pieces of web data, each piece of web data composing either a portion of or a whole web page;

a reception step for receiving, from a user, an instruction for specifying information to be extracted from each of the obtained pieces of web data the instruction showing (i) a predetermined character string that is a display item in a list and is in association with the information to be extracted, (ii) a relative positional relationship in web data between the information to be extracted and the predetermined character string, and (iii) a character count of the information to be extracted; and a display step for
searching each of the obtained pieces of web data for the predetermined character string, extracting information based on the character count of the information to be extracted, from each of the pieces of web data in the relative positional relationship with the predetermined character string found as a result of the search, constructing, with use of the extracted information, a list having a heading item that is the predetermined character string, and displaying the constructed list.

13. The program of claim 12, wherein
the obtaining step includes:

a search substep for searching the one or more web servers connected to the network for a plurality of web pages, based on a keyword input by the user, and a selection substep for receiving a selection of web pages from among the plurality of web pages found in the search substep, and in the obtaining step, web data relating to the selected web pages is obtained.

* * * * *